United States Patent [19]
Lötzer

[11] Patent Number: 4,938,149
[45] Date of Patent: Jul. 3, 1990

[54] RAIL TRANSPORT SWITCH ARRANGEMENT

[75] Inventor: Karl Lötzer, Munich, Fed. Rep. of Germany

[73] Assignee: Veit Transpo GmbH, Landsberg, Fed. Rep. of Germany

[21] Appl. No.: 253,169

[22] Filed: Oct. 4, 1988

[30] Foreign Application Priority Data

Oct. 12, 1987 [DE] Fed. Rep. of Germany ....... 3734506

[51] Int. Cl.⁵ .................... E01B 7/00; E01B 25/06
[52] U.S. Cl. .................... 104/102; 104/130; 246/430; 246/392
[58] Field of Search .......... 104/96, 130, 102; 246/415 R, 417, 430, 380, 392, 446

[56] References Cited

U.S. PATENT DOCUMENTS

| | | | |
|---|---|---|---|
| 482,957 | 9/1892 | Allen | 104/130 |
| 855,067 | 5/1907 | Norden | 246/430 |
| 1,050,421 | 1/1913 | Bilyeu | 246/430 |
| 3,046,909 | 7/1962 | Gorjanc | 246/430 X |
| 3,828,682 | 8/1974 | Who . | |
| 4,336,757 | 6/1982 | Toder | 104/102 |

FOREIGN PATENT DOCUMENTS

| | | | |
|---|---|---|---|
| 2158265 | 11/1971 | Fed. Rep. of Germany . | |
| 2187959 | 1/1974 | France . | |
| 0014832 | 7/1926 | Netherlands | 246/430 |
| 0319269 | 2/1957 | Switzerland | 246/415 R |
| 1300063 | 3/1987 | U.S.S.R. | 104/130 |

OTHER PUBLICATIONS

"Translift-hangebahnen", Jun. 23, 1983, West Germany.

*Primary Examiner*—Andres Kashnikow
*Assistant Examiner*—Virna Lissi Mojica
*Attorney, Agent, or Firm*—Finnegan, Henderson, Farabow, Garrett and Dunner

[57] ABSTRACT

The switch arrangement allocates first and second connections in groups to each other. A carriage is used which supports a number of connection elements corresponding to the number of second connections per each group. The carriage is movable along the first and the second connections in such fashion that each of the second connections of the group can be connected to the first connection allocated to that group. The switch arrangement is particularly suited for a suspension conveyor system for the feeding of flyer bobbins to ring spinners.

14 Claims, 5 Drawing Sheets

RAIL TRANSPORT SWITCH ARRANGEMENT

BACKGROUND OF INVENTION

1. Field of Invention

The invention relates to a switch arrangement; and more particularly to a switch arrangement for a rail transport system.

2. Related Art

Switch arrangements were previously used for a suspension conveyor system in a spinning mill for transporting bobbins from a flyer to a ring spinner. Since the ring spinner has a substantially greater bobbin capacity than the flyer it is necessary initially to intermediately store all the conveyor trains of bobbins coming from the flyer; and to then combine them in a train of the required length. For this purpose a plurality of switch tongues are built into the main section coming from the flyer. Each switch tongue is capable of establishing a connection from a first connection of the main rail section to a second connection at a storage section. The switch tongues are disposed pivotably at fixed points in the spaces between the first and the second connections. Each of the storage sections is connected to a second main section at its end via a further switch, which leads to the ring spinner. Such a constructional design is evidently extremely complex, because switches must be provided in the main section which are equal in number to the switches provided in the storage sections. Moreover, each of the switches require a minimum radius of curvature and a minimum spacing for their pivotability. Therefore, the distance between the storage sections cannot be kept as small as required for optimum space utilization of the storage space. The spacing between the first and the allocated second connections is blocked by the stationary switch tongues and their adjustment mechanisms so that it is extremely difficult to accommodate a further suspension conveyor system for the feeding of additionally required workpiece in this area.

SUMMARY OF THE INVENTION

Therefore, an object of the invention is to provide a switch arrangement where connections between a larger number of paths can be established with simple construction and without additional space requirements.

According to the present invention, the movable carriage in combination with the connection element, the spacing between the first and the allocated second connections can be cleared in a simple fashion, if a second workpiece is required to must move through said spacing. Due to the allocation of each of a group of second connections to a single first connection, a minimum radius of curvature is not required when determining the spacing of the second conections relative to each other. The number of the movable elements and the cost of fabrication is correspondingly reduced.

For applications where each of the second connections is to be fed via several main sections, a plurality of first connections are allocated to a group of second connections.

Where the free ends of the connection elements open at opposite sides of the carriage on which they are installed, first and second connections may be connected which face each other at a distance.

Where the free ends of the connection elements open at the same side of the carriage, the first connections extend substantially parallel to the second connections.

A special advantages of the switch arrangement according to the present invention include compensation of level differences, i.e. the connection of transport planes are vertically on top of each other between the first and the second connection. This cannot readily be achieved with the conventional switch tongues, and this only with constructional difficulties.

According to the present invention, the distances between the first connections can be selected sufficiently large that the first connection can be connected via two rails to the main section. If a conveyor train arriving in one direction on the main section, is first of all to be guided in the direction of the second connection, and then from the second connection back to the main section, and then further conveyed in the same direction on the main section, the train need not be shunted once again, changing its direction of conveyance.

The drive of the carriage via a rack drive permits an automatic control of the carriage; particularly, if an incremental generator is used together with a suitable pitch of the rack so that the carriage comes to a standstill exactly at the intended point, at which the desired connection between a first and a second connection can be established. The carriage can be automatically controlled both upon changing of the connections with one group, and in the connecting of a further first connection to a second connection of the group allocated to it.

The switch arrangement of the invention is of special advantage when used in a ring spinner. If the transport system for the flyer bobbins is fed into the working area of the ring spinner, the flyer bobbins can be directly reeled off from the conveyor trains. This saves the transfer of the flyer bobbins from the transport system into the ring spinner, which requires a lot of time and a large number of staff. The difficulty resides in the fact that the conveyor rails in the ring spinner must be an extremely small distance from each other, which cannot be achieved with conventionally used switches. Moreover, a conductor rail or running rails for a thread binding device may run around the ring spinner. Thus, it cannot be avoided that the rail lines for the thread binding device, and the rail lines for the conveyor trains of the flyer bobbins cross each other. With the switch arrangement according to the present invention, the spacing between the connections can be cleared by the moving carriage if the thread binding device must pass therethrough.

The accompanying drawings which are incorporated in and constitute a part of the specification, illustrate exemplary embodiments of the invention, and together with the description, serve to explain the principles of the invention.

DESCRIPTION OF PREFERRED EMBODIMENTS

Figure 1:
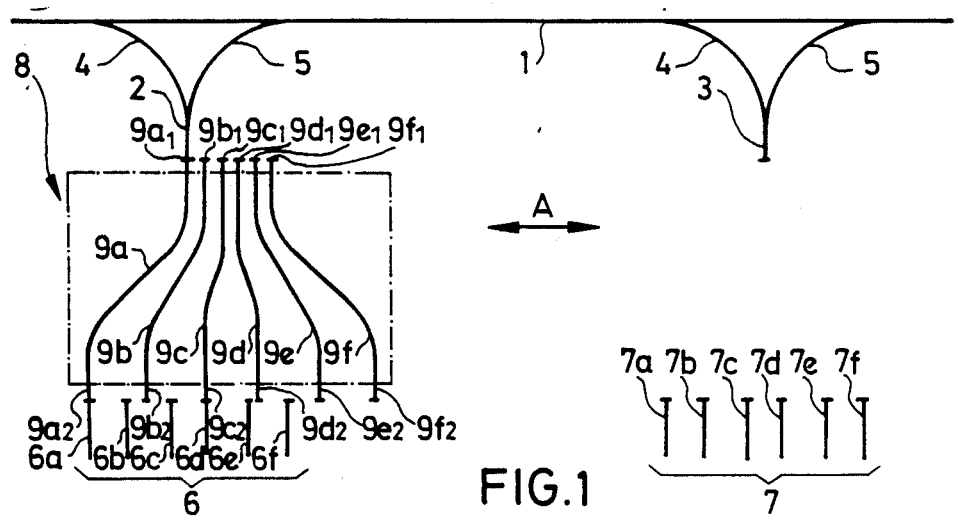
FIG. 1 shows a schematic representation of a rail transport system with the switch arrangement according to one embodiment of the invention with the carriage in a first position.
Figure 2:
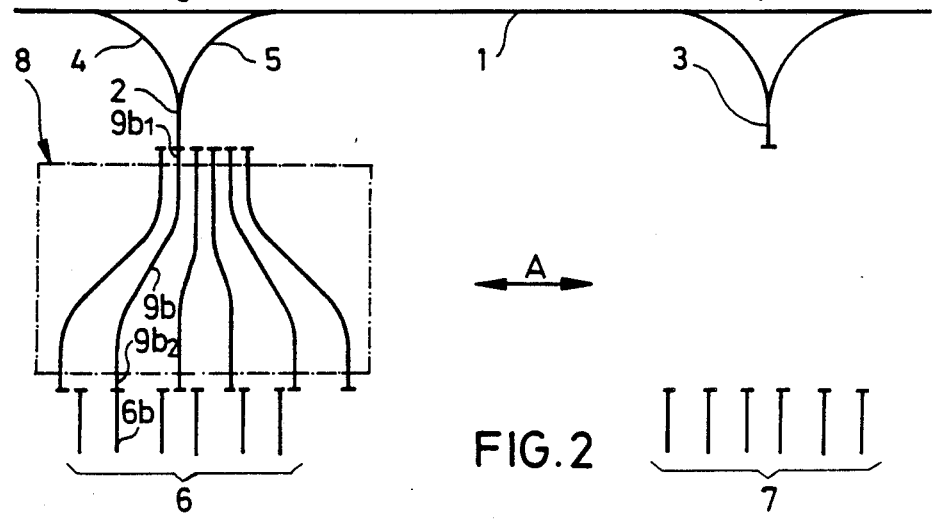
FIG. 2 shows the transport system of FIG. 1 in a second position of the carriage.
Figure 3:
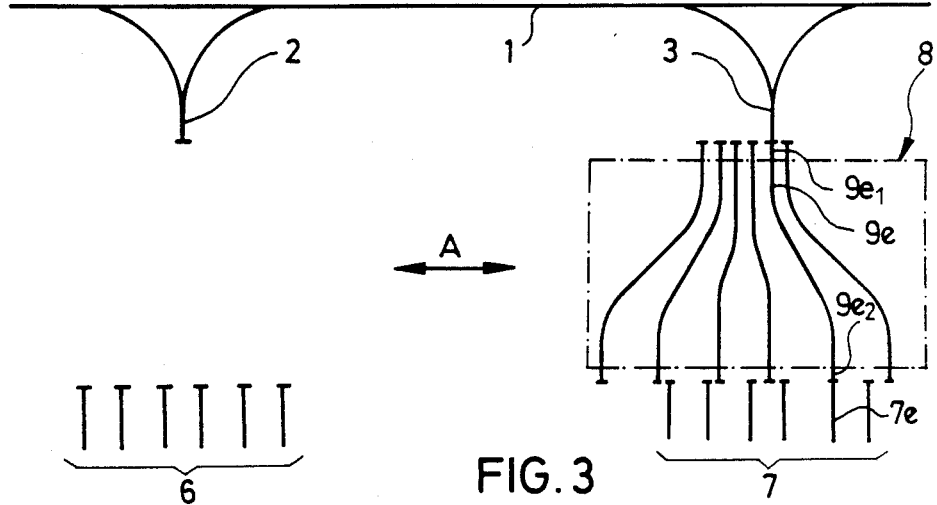
FIG. 3 shows the transport system according to FIG. 1 in a third position of the carriage.

A rail system for a suspension conveyor can be understood from FIGS. 1 to 3 in schematic representation. The rail system has a main section 1, from which two first connections 2 and 3 extending substantially vertically to the main section 1 branch off. The connections 2 and 3 are connected in such fashion to the main section 1 via branches and junctions 4 and 5 equipped with conventional switches or designed as switches that a conveyor train (not shown) arriving from both directions on the main section can get to the first connections 2 and 3 without shunting. A group 6 ot 7 of second connections $6a$ to $6f$ or $7a$ to $7f$ each is facing each of the first connections 2 and 3 with a spacing. Each of the groups 6 or 7 contains the same number, i.e. six second connections. The second connections $6a$ to $6f$ or $7a$ to $7f$ are aligned within their group 6 or 7 and with respect to the adjacent group and extend parallel to each other and parallel to the first connections 2 and 3. The vertical distance between the first connections 2 or 3 and the respectively allocated group 6 or 7, i.e. the spacing between the first and second connections is the same. The parallel distances between the individual second connections of each group may be different and coordinated with the constructional facts of the rail system connected to the second connections. A carriage 8 outlined in dash-dotted fashion can be moved in the direction of the double arrow A in the space between the first connections 2 or 3 and the groups 6 or 7 of the second connections. The carriage 8 supports a plurality of connection elements $9a$ to $9f$, whose number corresponds suitably to the number of the second connections of each group 6 or 7. Each connection element $9a$ to $9f$ has in each case a first free end $9a_1$ to $9f_1$ and a second free end $9a_2$ to $9f_2$. The free ends of the connection elements 9 are in each case aligned with respect to each other and disposed in such fashion that upon the movement of the carriage in the direction of the arrow A, each of the first free ends $9a_1$ to $9f_1$ can be brought into transport connection with the first connections 2 or 3. The second free ends $9a_2$ and $9f_2$ are also aligned with respect to each other, and disposed in such fashion that the second free end of a connection element is in transport connection with a second connection if the first free end of the same connection element is in alignment with the first connection.

As can be seen from the drawings, the distances of the first free ends relative each other can be optionally selected. These distances are suitably as small as possible to keep the travelling path of the carriage 8 as small as possible in the area of the first connection. The distance between two adjacent second free ends each results from the distance between the second connections allocated to these second free ends plus the distance of the allocated first free ends.

As is shown by FIG. 1 the main section 1 is connected to the second connection $6a$ via the first connection 2, the first free end $9a_1$ of the connection element $9a$ and its second free end $9a_2$. If another connection is to be established the carriage 8 is displaced in the direction of the double arrow A. FIG. 2 shows a position in which the carriage 8 was moved towards the left by one switching step. In this position the main section 1 is connected to the next following second connection $6b$ via the first connection 2, the first free end $9b_1$ of the connection element $9b$ and its second free end $9b_2$. The first connection 2 can be connected with each further second connection $6c$ to $6f$ of the group 6 in the same fashion via the further connection elements $9c$ to $9f$.

If the carriage 8 is displaced towards the right in the direction of the double arrow the main section 1 can be connected—as is shown by FIG. 3—to all second connections of the group 7 in the fashion already described. In the repesented example of embodiment the first connection 3 is connected to the second connection $7e$ via the first free end $9e_1$ of the connection element $9e$ and its second free end $9e_2$. Also here each of the second connection $7a$ to $7f$ can be connected to the first connection 3 via the respectively allocated connection element $9a$ to $9f$ by suitably moving the carriage 8.

Figure 4:
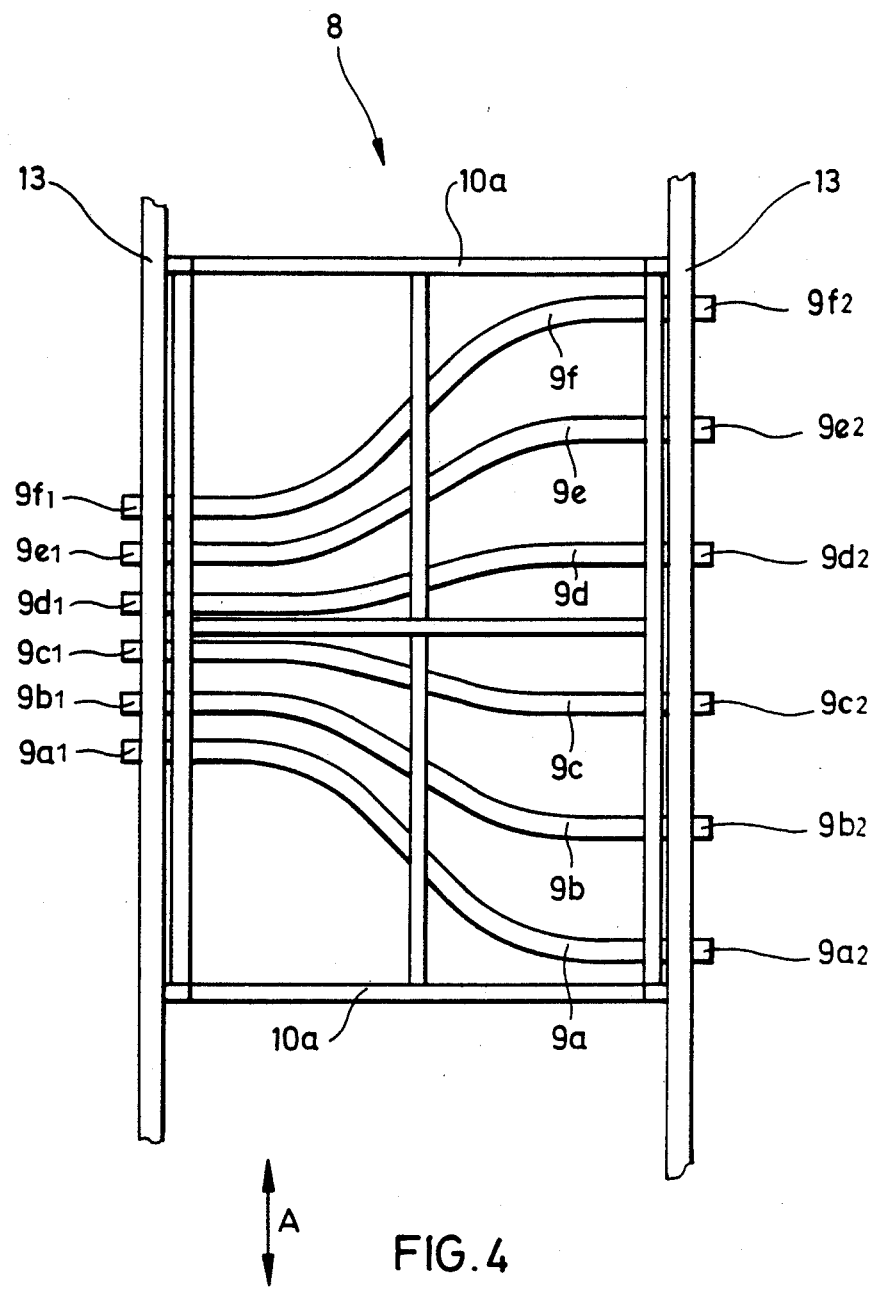
FIG. 4 shows a top view on the carriage of the switch arrangement.
Figure 5:
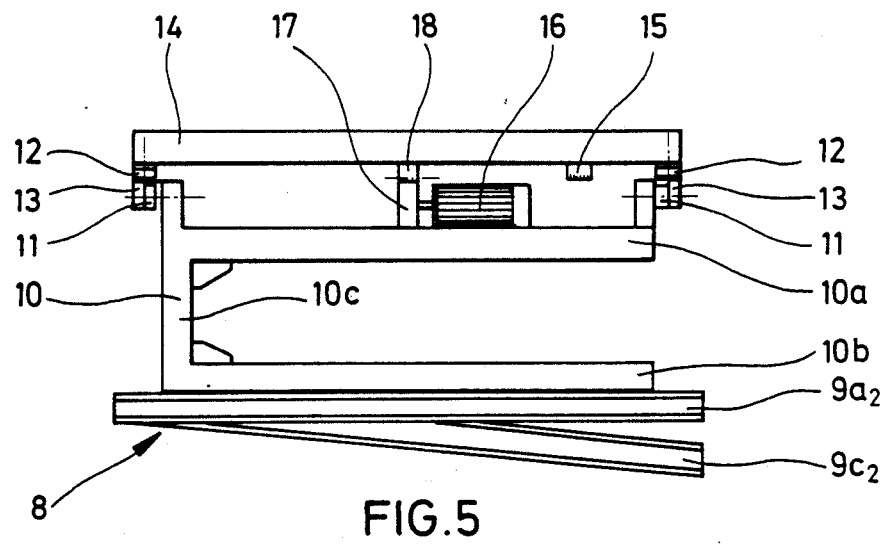
FIG. 5 shows the lateral view of FIG. 4.
Figure 6:
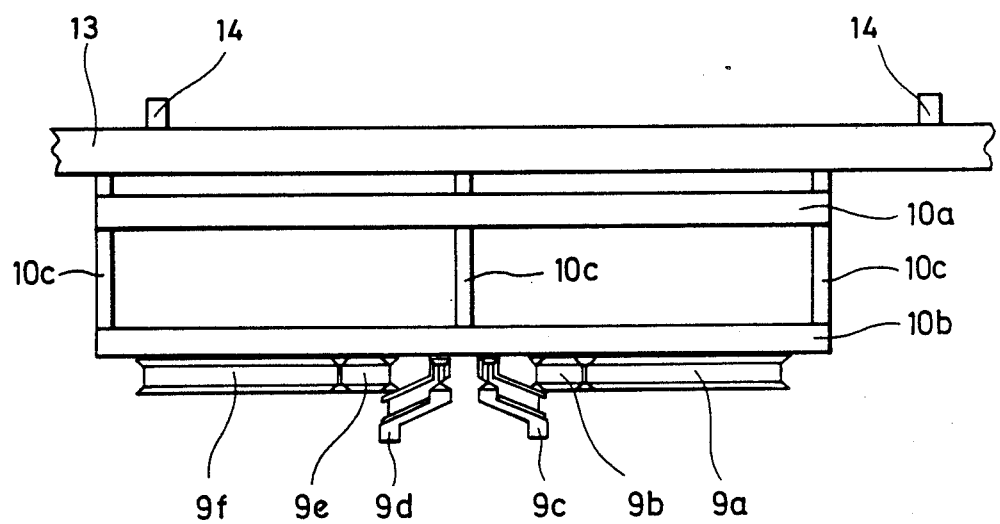
FIG. 6 shows the front view of FIG. 4.

A carriage 8 for a suspension conveyor system is represented in FIGS. 4 to 6. As is shown by FIG. 5 the carriage 8 has a travelling frame 10 which consists of an upper supporting frame $10a$, a lower supporting frame $10b$ and vertical connecting struts $10c$, which connect the upper and lower supporting frames $10a$ and $10b$ to a U-shaped cross-section. The length of the vertical struts $10c$ is suitably selected in such fashion that the upper and the lower supporting frames $10a$ or $10b$ have a distance to each other which permits that the upper supporting frame 10 can engage over a secondary conveyor system or a conductor rail and the lower supporting frame 10 can engage below this rail. Thus a crossing possibility for two rail systems is provided in simple fashion. Travelling rollers 11 and guide rollers 12 are mounted on the upper supporting frame 10 in suitable bearings (not shown), which roll on and are supported by travelling sections 13 extending in parallel. The travelling sections 13 are fastened in customary fashion to a support 14 in such fashion that a neat straight-line guide of the carriage 8 is achieved in its movement along the double arrow A. A conductor rail 15 for a driving motor 16 is furthermore fastened to the support 14. The driving motor 16 drives a toothed pinion 17 which rolls in a rack 18 extending in parallel to the travelling sections 13. The driving motor 16 is suitably controlled via an incremental generator (not shown) by means of which also an adjustment movement across half a tooth or one fourth of a tooth can be implemented. In this fashion it is possible to move the carriage 8 automatically to any predetermined point.

The connection elements 9 are fastened to the lower side of the lower supporting frame $10b$. Pieces of the same rail are suitably used as connection elements as they are also used for the main section 1 or the connections 2, 3, 6 and 7. If the profiled rail represented in more detail in FIG. 6 is used, it can be bent in simple fashion so that the aforementioned differences in the distances of the first free ends to each other and of the second free ends to each other result and the free ends themselves form a straight continuation of the respective connections.

As can be understood from FIGS. 5 and 6 it is not imperative that the second free ends of the connection elements 9 are all on the same transport level. In the represented exemplary embodiment the two central connection elements 9c or 9d are downwardly bent so that their second free ends $9c_2$ or $9d_2$ are in alignment with second connections (not shown) which are below the level of the allocated first connections.

Figure 7:
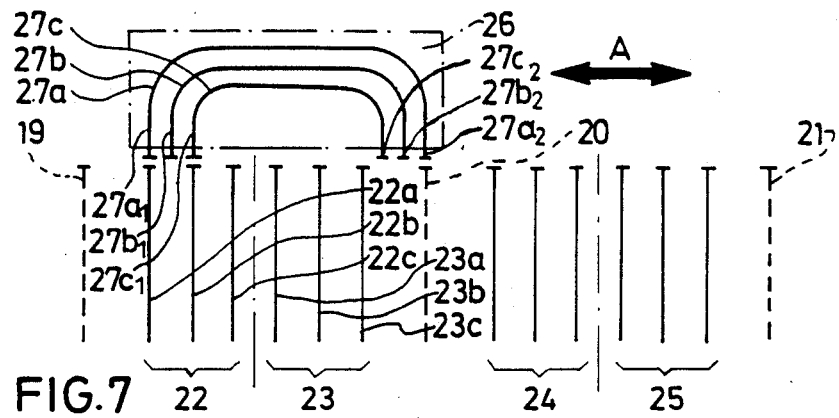
FIG. 7 shows a second exemplary embodiment of a rail transport system in schematic representation with the carriage in a first position.
Figure 8:
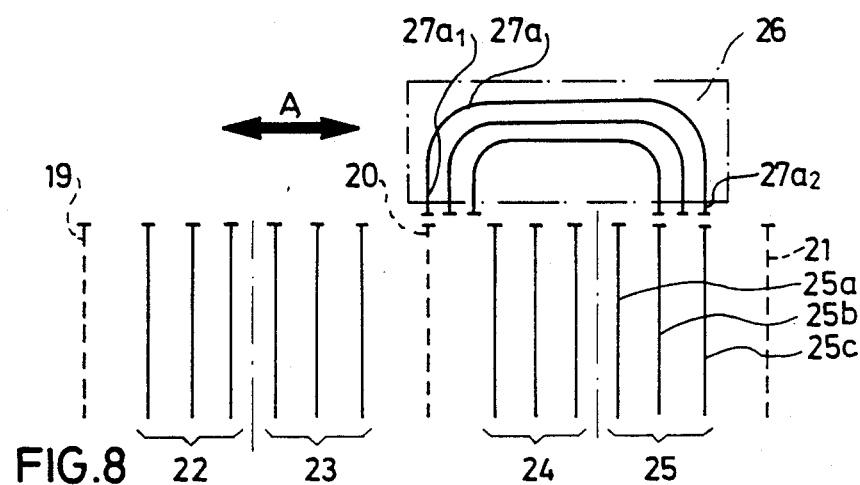
FIG. 8 shows the transport system of FIG. 7 in a second position of the carriage.

The schematic representation of a further example of embodiment of the switch arrangement is shown in FIGS. 7 and 8. To illustrate the representation the first connections 19, 20, 21 are represented in a broken line. Groups 22, 23, 24, 25 extend in parallel to the first connections 19, 20, 21 to respectively three second connections. Between two first connections 19 and 20 or 20 and 21 two groups each 22, 23 or 24, 25 of second connections are disposed symmetrically around the dash-dotted central line between the two first connections.

The free ends of the first connections 19, 20, 21 and the free ends of all second connections of each group 22, 23, 24, 25 extend in parallel and are in alignment and spaced. A carriage 26 outlined in dash-dotted fashion can be moved across this distance, which can be constructed analogously to the carriage 8. The carriage 26 has three connection elements 27a to 27c which can only be suitably guided in inclined fashion for bridging differences in level. Each of the connection elements 27a to 27c is shaped in such fashion that its two free ends $27a_1$ and $27a_2$ and $27b_2$, $27c_1$ and $27c_2$ open substantially in parallel to each other at the side of the carriage facing the connections. The distances of the first and second connections to each other are selected so that in the case of a displacement movement of the carriage 26 at least one first connection can be connected to each second connection of a group 22, 23, 24. The carriage 26 is moved in such fashion in FIG. 7 that the central one of the second connections 20 faces the second free end $27a_2$ of the connection element 27a, while the first free end of the connection element 27a is in alignment with the first of the second connections 22a of the group 22. Conveyor trains can thus be conveyed back from the rail track connected to the first connection 20 via the connection element 27a on the rail track connected to the second connection 22a. If e.g. the second one of the second connections 22b of the group 22 is to be connected to the first connection 20, the carriage is displaced towards the right by one switching step in the direction of the double arrow A until the second free end $27b_2$ of the connection element 27b is opposite to the first connection 20, the first free end $27b_1$ being in alignment with the desired second connection 22b. If e.g. the last second connection 23c of the group 23 is to be fed the carriage 26 is displaced to the right that much in the direction of the double arrow A until the first free end $27a_1$ of the connection element 27a is in alignment with the first connection 19. In this position the second free end $27a_2$ is in alignment with the desired second connection 23c.

As is shown by FIG. 8 the first connection 20 is not only allocated to the second connections of the group 22, but also to the second connections of the group 25. In the drawn position of the carriage 26 the first free end 27a of the connection element 27 is in alignment with the first connection 20 and the second free end $27a_2$ is in alignment with the last second connection 25c of the group 25. The other two connections of the group 25 can be connected analogously to the first connection 20 by stepwise displacement of the carriage 26 to the left.

Figure 9:
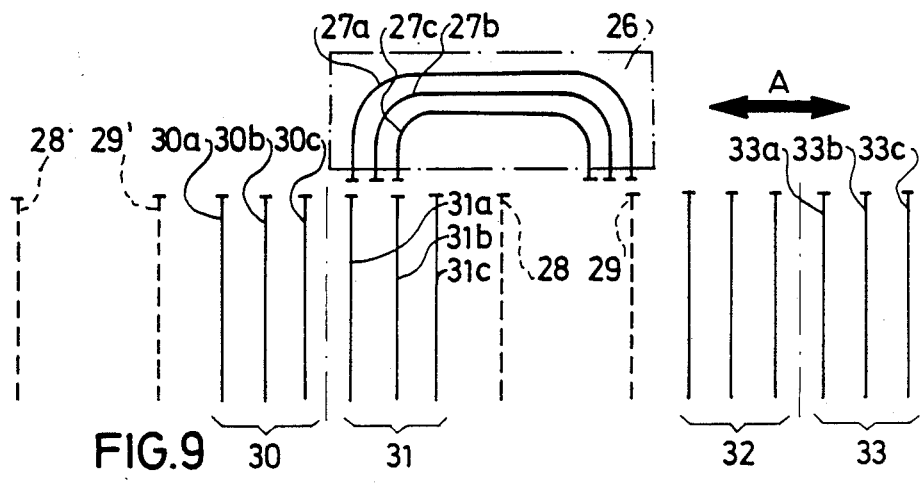
FIG. 9 shows a third exemplary embodiment of the rail transport system in schematic representation.

FIG. 9 describes a further exemplary embodiment in which two first connections 28 and 29 are disposed side-by-side. Two groups each 30, 31 or 32, 33 of respectively three second connections are disposed on both sides of the first connections 28, 29. The carriage 26 corresponds to the carriage of FIGS. 7 and 8. As is shown by FIG. 9 the first connection 29 can be connected to the group 31 and in addition to the second connections of the group 33 upon displacement to the right in the direction of the double arrow A. The first connection 28 can be connected to all second connections 30a to 30c of the group 30 and to all second connections 32a to 32c of the group 32. If the second connections of the groups 30 or 31 are to be connected to the two first connections, further first connections 28', 29' can be disposed on the side of the groups 30, 31 facing the connections 28, 29. Then the connection 28' can be connected to the second connections of the group 30 and the first connection 29' can be connected to the second connections of the group 31.

Figure 10:
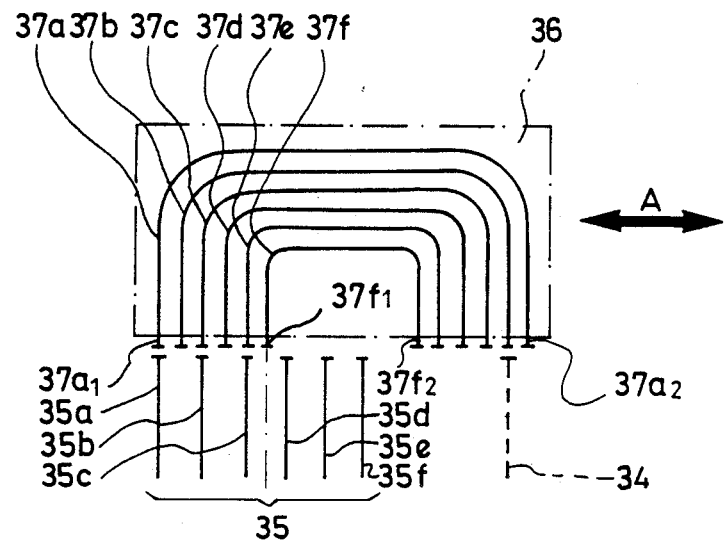
FIG. 10 shows a fourth exemplary embodiment of the rail transport system in schematic representation for bridging the differences in level.

An exemplary embodiment can be ascertained from FIG. 10 wherein differences in level between a first connection 34 and a group 35 of six second connections can be bridged. Each second connection of the group 35 can be at a level different to the first connection and to the other second connections in this exemplary embodiment. For this purpose a carriage 36 is provided on which the number of connection elements 27 disposed on it is equal to the number of existing second connections. Both free ends of each connection element 37 open at the same side of the carriage 36. The first free ends $37a_1$ to $37f_1$ are exactly at the level of the second connection 35a to 35f allocated to this connection element to bridge the differences in level, while the second free ends $37a_2$ to $37f_2$ are disposed at the level of the first connection 34. The connection elements 37 are thus guided in inclined fashion in analog fashion as e.g. the connection element 9c in FIG. 5. In the position of the carriage 36 drawn in FIG. 10 the second free end $37a_2$ of the connection element 37a is in alignment with the first connection 34 which is at a higher level and the first free end $37a_1$ of the same connection element 34a is in alignment with the second connection 35a being at a lower level. If the carriage 36 is displaced to the right in the direction of the double arrow A in FIG. 10, all second free ends of the connection elements 37 are successively aligned with the first connection 34, whereby the respectively allocated first free end of the connection element 37 is in alignment with the corresponding second connection in the already described fashion.

Figure 11:
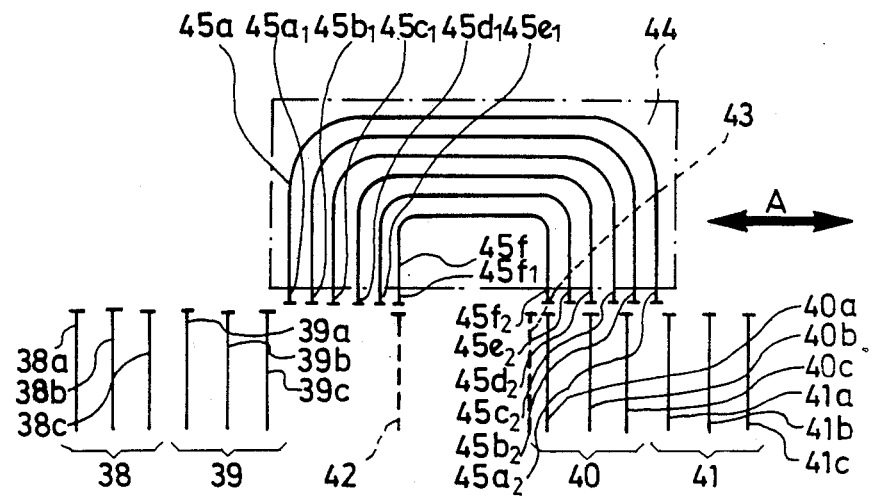
FIG. 11 shows a fifth exemplary of embodiment of the rail transport system in schematic representation for bridging the differences in level.
Figure 12:
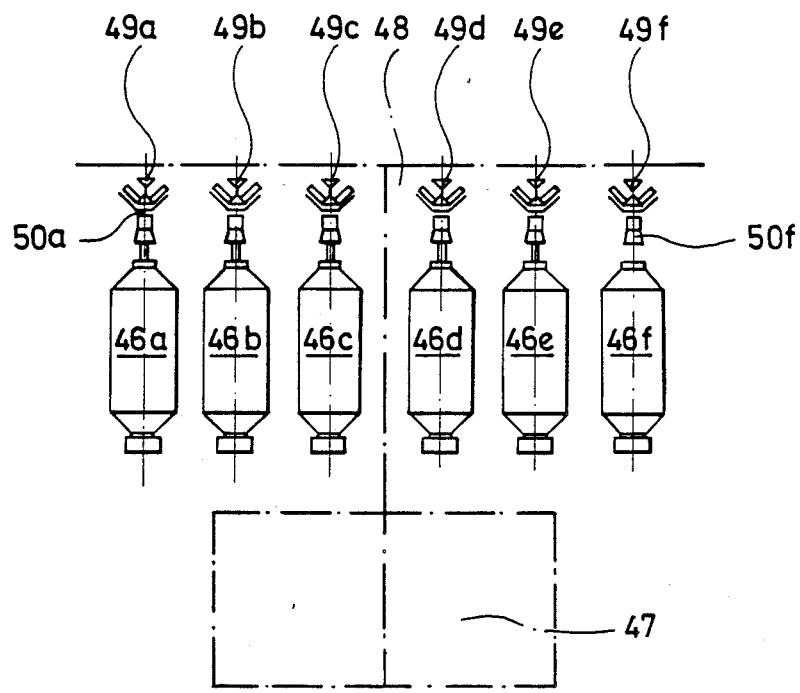

FIG. 11 describes a second possibility of bridging differences in level. In this exemplary embodiment two first connections 42 and 43 are disposed asymetrically between two first groups each 38, 39 or 40, 41 of three second connections each. The first connection 42 is allocated to the groups 38 and 40 and the first connection 43 is allocated to the groups 39 and 41. A carriage 44 is provided which has six connection elements 45a to 45f. The connection elements 45a to 45f are disposed on the carriage 44 in such inclined fashion that the first free ends $45d_1$, $45e_1$ and $45f_1$ and the second free ends $45a_2$, $45b_2$ and $45c_2$ are each on the joint level of the first connections 42 and 43. The remaining first free ends $45a_1$, $45b_1$ and $45c_1$ of the connection elements 45 are at the joint level of the second connections of the groups 38 and 39 which may be different from the level of the first connections 42, 43. The remaining second free ends $45d_2$, $45e_e$ and $45f_2$ are at the level of the groups 40. The second connections of the groups 38 and 39 and of the groups 40 and 41 may be at a joint level. However, also the second connections of the groups 38 and 39 may be on a joint level and the second connections of the groups 40 and 41 may in turn be at a joint level being however different from that of the groups 38 and 39. It is furthermore possible to bring one or two second connections within the groups 38 and 39 or 40 and 41 to a deviating level provided this concerns in each case the same second connection of each group. It is e.g. possible to bring the connections 38a and 39a to a joint level which is different from the level of the connections 38b and 38c and 39b and 39c.

In the represented exemplary embodiment the first free end $45f_2$ of the connection element 45f is in alignment with the first connection 42 and establishes a connection to the second connection 40a via the second free end $45f_2$. If the first connection 42 is to be connected with the second connection 40b, the carriage 44 is moved to the right by one switching step so that the first free end $45e_1$ of the connection element 45e is in alignment with the first connection 42, whereby the second end $45e_2$ is aligned with the second connection 40b. If then the second connection 41a of the group 41 is to be fed, the carriage 44 is still further moved to the right in the direction of the arrow A so that the first free end $45f_1$ is in alignment with the first connection 43. In this position the second free end $45f_2$ of the connection element $45f_2$ of the connection element 45f is connected to the second connection 41a. The same processes take place if the second connections of the group 38 and 39 are to be fed. For the feeding of for instance the second connection 39c the carriage 44 is displaced that much to the left until the second free end $45c_2$ is in alignment with the first connection 43. In this position the first free end 45c is in alignment with the second connection 39c. If the second connection 38a of the group 39 is to be fed, the carriage 44 is still further displaced to the left until the second free end $45a_2$ of the conection element 45a is in alignment with the first connection 42. In this position the first free end $45a_1$ establishes a connection with the second connection 38a.

A preferred field of application of the described switch arrangement is a transport system for transporting bobbins from a flyer to a plurality of allocated ring spinners. The ring spinner has a creel at which a plurality of rail tracks are disposed on which the conveyor trains for the bobbins can enter the working area of the ring spinner. Each of the rail tracks is connected to one of the second connections of a group 6, 7 or 35 in the exemplary embodiments according to FIGS. 1 to 3 or 10 or to two adjacent groups 22, 23 or 24, 25 or 30, 31 or 32, 33 or 38, 39 or 40, 41 in the exemplary embodiment according to FIGS. 7, 8, 9, 11. The lateral space within the creel is of course extremely restricted. However, it is possible due to the switch arrangement according to the invention to dipose the rail tracks that closely in side-by-side relationship that the bobbins can be directly spun off from the conveyor train.

If during the spinning the thread binding device or another operating device must be transferred from one long side of the ring spinner to the other long side, the carriage of the switch arrangement can be moved to clear the space in front of the narrow sides of the ring spinner so that the device can pass unhinderedly. It is possible to modify the described and illustrated exemplary embodiments to redesign the switch arrangement according to the invention e.g. also for a floor rail system. The number of the second connections per group can then be varied in accordance with the requirements. If it is necessary the connections within one group can also be optionally fed via two first connections. The number of the connection elements on the carriage can also be varied. It is furthermore possible to use two or more carriages in a switch arrangement, if this seems to be suitable. The ability of the switch arrangement according to the invention to bridge differences in level can furthermore also be used in ring spinners, in which the conveyor trains only required for spinning off are located in the creel, while only a reserve section is provided outside of and obliquely above the creel, from which bobbins can be manually transferred into the creel.

I claim:

1. A switch arrangement for a rail transport system, comprising:
    a plurality of first rail connections laterally spaced from one another a first predetermined distance;
    a plurality of groups of second rail connections, each group of second rail connections being allocated to one of the plurality of first rail connections, each one of the plurality of groups extending laterally a second predetermined distance less than the first predetermined distance, each group having a predetermined number of second rail connections;
    the plurality of first rail connections being spaced from and opposing the plurality of groups of second rail connections in a longitudinal direction to define opposite sides of a path;
    a carriage movably mounted in the path between the defined opposite side;
    a plurality of laterally spaced rail connecting elements fixedly mounted to the carriage, the number of rail connecting elements corresponding to the number of second rail connections in each group;
    each of the rail connecting elements having a first free end extending in a direction toward one side of the path defined by the first rail connections and a second free end extending in a direction toward the opposite side of the path defined by the groups of second rail connections;
    the second free end being offset from the first free end of each corresponding rail connecting element for aligning with a different second rail connection of a respective group at times when the first free end is aligned with the allocated one of said plurality of first rail connections; and
    means for moving the carriage back and forth laterally in the defined path for aligning the second free ends of the connecting elements with corresponding ones of the plurality of second rail connections of each of the plurality of groups.

2. A switch arrangement according to claim 1, wherein each of the plurality of groups has the same number of second rail connections.

3. A switch arrangement according to claim 1 wherein at least one second rail connection, is at a level different than the at least one first rail connection, and the respective allocated rail connecting elements are inclined for compensation of the level difference.

4. A switch arrangement for a rail transport system, comprising:
- at least one first rail connection;
- at least one group of second rail connections, the one group including, a plurality of second rail connections allocated to the at least one first rail connection;
- the at least one first rail connection and the at least one group of second rail connections being spaced laterally relative one another defining one boundary of a path;
- a carriage movable in opposite directions along the defined path defined by the boundary;
- a plurality of laterally spaced rail connecting elements fixedly mounted to the carriage, each of the rail connecting elements having first and second free ends extending in the direction toward the defined boundary;
- each of the plurality of connecting elements being spaced from another and configured for aligning one of the first and second free ends of each connecting element with a respective one of the group of second rail connections at times when the other of the first and second free ends of connecting element is aligned with the at least one first rail connection; and
- means for moving the carriage in opposite directions along the defined path for aligning selectively the first and second free ends of the connecting elements with the respective at least first rail connection and each of the group of second rail connections.

5. A switch arrangement according to claim 4, wherein the at least one first rail connection is a plurality of laterally spaced first rail connections, and the at least one group of second rail connections is a plurality of groups of laterally spaced second rail connections; and wherein each of the plurality of groups has an equal number of the plurality of second rail connections.

6. A switch arrangement according to claim 5 wherein each of the plurality of first rail connections is allocated to a specific group of the plurality of groups of second rail connections.

7. A switch arrangement according to claim 4, wherein at least one of the plurality of second rail connections is disposed vertically at a level different than at least one of the plurality of first rail connections, and the connecting element allocated to one of the second rail connections is vertically inclined to compensate for the level difference.

8. A switch arrangement for a rail transport system, comprising:
- at least one first rail connection disposed at a first level;
- at least one group of a plurality of laterally spaced second rail connections allocated to the at least one first rail connection, at least one of the plurality of second rail connections of a group being disposed at a second level vertically distant from the first level;
- a carriage movably mounted to travel along a path adjacent the at least one first rail connection and the group of second rail connections;
- a plurality of laterally spaced connecting elements fixedly mounted on the carriage, each of the connecting elements having opposite first and second free ends extending from the carriage, one of the first and second free ends of the at least one connecting element being disposed at the first level, and the other free end thereof being disposed at the second level;
- each of first and second free ends of the plurality of rail connecting elements being laterally offset from each other a predetermined distance wherein each one of the first free ends is selectively aligned with the at least one first rail connection at times when the corresponding second free end of the corresponding connecting element is aligned with a respective one of the plurality of second rail connections; and
- means for moving the carriage back and forth along said path for selectively forming transport routes from the at least one first rail connection and the aligned ones of the at least one group of rail connections, at least one of the transport routes extending from the at least one first rail connection via the connecting element having each of the first and second free ends at the corresponding first and second levels, and the at least one second rail connection of the at least one group being disposed at the second level.

9. A switch arrangement according to claim 8 wherein the at least one group of second rail connections includes a plurality of groups with each group having an equal number of plurality of second rail connections.

10. A switch arrangement according to claim 8 wherein the at least one first rail connection opposes the at least one group of second rail connections to define opposite boundaries of a path, and the first free ends of said rail connecting elements extend from one side of the carriage toward the at least one first rail connection and the second free ends extend from the other side of the carriage toward the at least one group of second rail connections.

11. A switch arrangement according to claim 8, wherein the at least one first rail connection and the at least one group of second rail connections are laterally spaced from each other defining one boundary of the path, and the first and said second free ends extend from the same side of said carriage in a direction toward the one boundary.

12. A switch arrangement according to claim 8, wherein the at least one first rail connection is a plurality of first rail connections each allocated to one of a single group of second rail connections.

13. A switch arrangement according to claims 1, 4 or 8 further comprising a main rail section having a branch rail and an opening, and the at least one first rail connection is connected to said opening.

14. A switch arrangement according to claims 1, 4 or 8 wherein the means for moving the carriage back and forth along the path includes a rack gear.

* * * * *